(12) United States Patent
Kurane (10) Patent No.: US 9,609,166 B2
(45) Date of Patent: Mar. 28, 2017

(54) TRANSPORTING APPARATUS AND PRINTING APPARATUS INCLUDING THE SAME

(71) Applicant: Seiko Epson Corporation, Tokyo (JP)

(72) Inventor: Haruhisa Kurane, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/882,930

(22) Filed: Oct. 14, 2015

(65) Prior Publication Data

US 2016/0112596 A1 Apr. 21, 2016

(30) Foreign Application Priority Data

Oct. 16, 2014 (JP) ................................ 2014-211714

(51) Int. Cl.
| | | |
|---|---|---|
| *H04N 1/047* | (2006.01) | |
| *H04N 1/04* | (2006.01) | |
| *H04N 1/12* | (2006.01) | |
| *G06F 3/12* | (2006.01) | |
| *G06K 15/02* | (2006.01) | |

(52) U.S. Cl.
CPC ......... *H04N 1/0476* (2013.01); *H04N 1/1215* (2013.01)

(58) Field of Classification Search
None
See application file for complete search history.

(56) References Cited

U.S. PATENT DOCUMENTS

| | | | | |
|---|---|---|---|---|
| 2009/0322819 | A1* | 12/2009 | Hayashi | ................. B41J 11/007 347/16 |
| 2009/0323094 | A1* | 12/2009 | Hayashi | ................... B41J 11/42 358/1.12 |
| 2010/0310264 | A1* | 12/2010 | Ishida | ................ G03G 15/5029 399/45 |
| 2011/0102815 | A1 | 5/2011 | Watanabe | |

(Continued)

FOREIGN PATENT DOCUMENTS

| | | | | |
|---|---|---|---|---|
| JP | 2000-163623 | * | 6/2000 | ............... G07D 7/00 |
| JP | 2011-093242 A | | 5/2011 | |

(Continued)

*Primary Examiner* — Beniyam Menberu (57) ABSTRACT

Transporting apparatus includes a transporting section configured to transport continuous-form paper, an imaging apparatus including a light applying section for emitting light toward the continuous-form paper, and an imaging element for taking images of continuous-form paper based on the light from the light applying section, a transportation amount computing section configured to compute the transportation amount of the continuous-form paper based on the images of the continuous-form paper, and a transporting control section configured to control the transporting section based on the transportation amount. The imaging element includes a valid pixel area including a plurality of pixels where electric charge can be accumulated in accordance with the light reflected on the continuous-form paper, and a shading area including a plurality of pixels where the reflected light can be shaded. The light applying section emits light within a duration of reading a pixel signal of the shading area.

15 Claims, 6 Drawing Sheets

(56) References Cited

U.S. PATENT DOCUMENTS

2013/0135407 A1* 5/2013 Abe ..................... B41J 15/16
  347/102
2014/0118450 A1 5/2014 Abe et al.

FOREIGN PATENT DOCUMENTS

| JP | 2011-201152 A | 10/2011 |
| JP | 2012-096852 A | 5/2012 |
| JP | 2014-087965 A | 5/2014 |

\* cited by examiner

TRANSPORTING APPARATUS AND PRINTING APPARATUS INCLUDING THE SAME

BACKGROUND

1. Technical Field

The invention relates to a transporting apparatus that transports a transport target medium such as continuous-form paper used, for example, in printing, and a printing apparatus comprising the same.

2. Related Art

Figure 7:
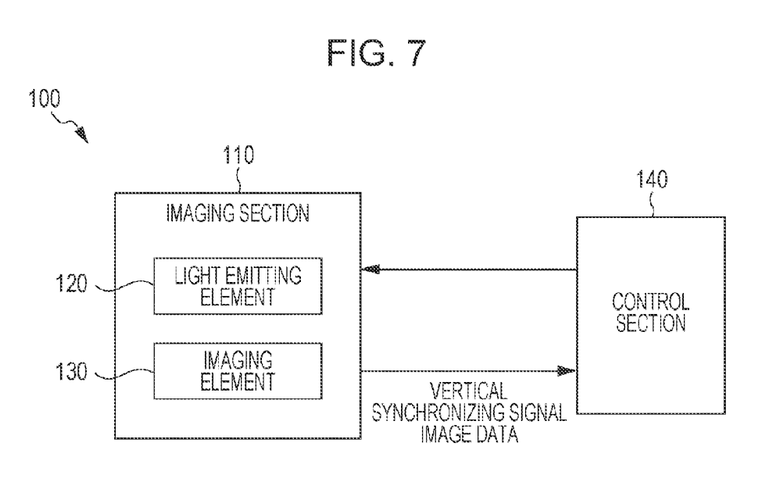
FIG. 7 is a block diagram illustrating the electric configuration of a printing apparatus in the prior art.

A printing apparatus 100 as one kind of a printing apparatus that performs printing on a transport target medium includes, as illustrated in FIG. 7, an imaging section 110 that continuously images the lower surface of the transport target medium transported by a transporting section (not illustrated), and a control section 140 that controls the operation of the transporting section and the imaging section 110 (for example, refer to JP-A-2014-87965).

Figure 8:
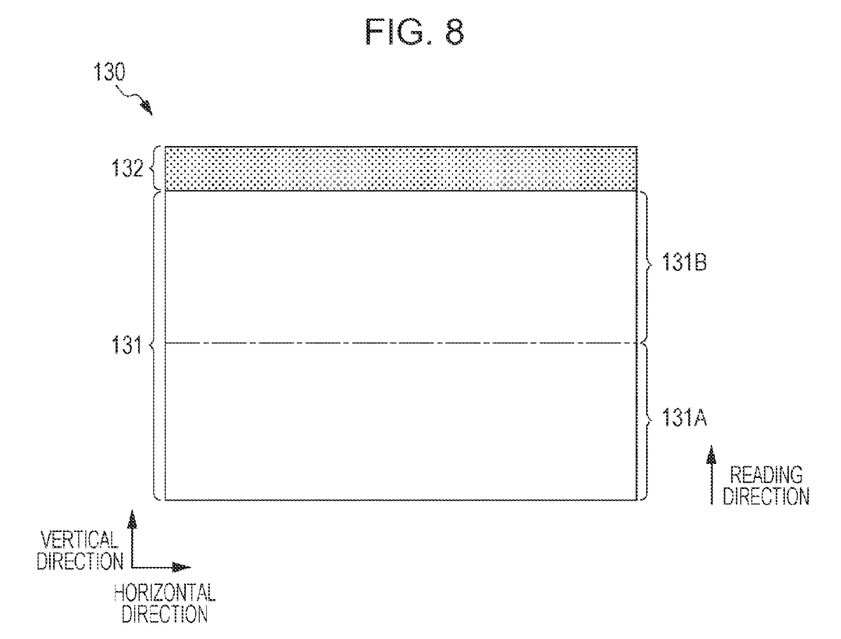
FIG. 8 is a schematic configuration diagram of the imaging element in the related art.

The imaging section 110 includes a light emitting element 120 that applies light on the transport target medium, and an imaging element 130 that images the transport target medium based on the reflected light from the transport target medium when the light emitting element 120 applies the light on the transport target medium. As illustrated in FIG. 8, the imaging element 130 is an area image sensor in which a plurality of pixels is arranged in a two-dimensional manner in the horizontal direction and the vertical direction respectively in FIG. 8, and is divided into a valid pixel area 131 in which electric charge is accumulated in response to the reflected light introduced to the imaging element 130, and a shading area 132 that shades the reflected light.

As illustrated in FIG. 7, the control section 140 causes the light emitting element 120 to emit light by synchronizing to a vertical synchronizing signal output from the imaging section 110, computes transportation amount of the transport target medium based on the surface property of the transport target medium (image data) imaged by the imaging section 110, and controls the transporting section based on the computed transportation amount of the transport target medium.

The control section 140 performs a template matching process of moving the template of a rectangular area set in advance in the image on the transport target medium that was imaged at the previous time and on the image on the transport target medium imaged at the present time and searching the position in which the similarity is maximized in order to compute the transportation amount of the transport target medium.

That is, the control section 140 computes the distance in the transporting direction between the position of the template in the image that was imaged at the previous time and the position of the template matched in the image imaged at the present time as the transportation amount.

Meanwhile, the vertical synchronizing signal output from the imaging section 110 is a signal synchronized to the timing of transmitting the image data of the transport target medium imaged by the imaging section 110 to the control section 140. In addition, the timing of the imaging section 110 transmitting the image data of the transport target medium to the control section 140 changes due to the specification of the imaging section 110. Because of this, the timing of the imaging section 110 outputting the vertical synchronizing signal to the control section 140 changes due to the specification of the imaging section 110, and the timing of emitting light of the light emitting element synchronized to such a vertical synchronizing signal also changes due to the specification of the imaging section 110. As a result, in the timing of emitting light of the light emitting element, there is a concern that a streak is generated in the image data, and a concern that the light emitting element 120 emits light at the duration of reading of the valid pixel area 131 of the imaging element 130.

For example, in the case where the light emitting element 120 emits light when a part of a dashed line of the valid pixel area 131 in FIG. 8 is read, the image data of the valid pixel area 131 changes with the dashed line as a boundary as in the following. In other words, in an area 131A which is an area at one side of the vertical direction from the dashed line in the valid pixel area 131, and in which pixels are already read, the image data when the light emitting element 120 emitted light at the previous time is the image data of the area 131A. In addition, in an area 131B which is an area at the other side of the vertical direction from the dashed line in the valid pixel area 131, and in which pixels are not read yet, the image data when the light emitting element 120 emits light at the present time is the image data of the area 131B. In other words, pixels imaged at the different times are included in the image data of one frame.

In such a case, there is a concern that the control section 140 considers by mistake the position of the template that is different from the position of the template to be matched in the image captured at the present time as the position in which the similarity is maximized when performing the process of template matching, and computes the transportation amount of the transport target medium based on the position of the mistaken template. Because of this, there is a concern that the computation accuracy of the transportation amount of the transport target medium is decreased. Meanwhile, such a problem is not limited to a printing apparatus, and also occurs in the transporting apparatus that transports the transport target medium.

SUMMARY

An advantage of some aspect of the invention is to provide a transporting apparatus in which it is possible to suppress the decrease in the computation accuracy of the transportation amount of the transport target medium and a printing apparatus including the same.

Hereinafter, means for realizing the invention and the operation effect thereof will be described.

According to an aspect of the invention, there is provided a transporting apparatus including a transporting section that transports a transport target medium, an imaging section that includes a light emitting element that applies light towards the transport target medium and an imaging element that is an imaging element in which a plurality of pixels are arranged in a two-dimensional manner in a horizontal direction and a vertical direction and that images the transport target medium based on the light of the light emitting element, a transportation amount computing section that computes a transportation amount of the transport target medium based on the image of the transport target medium captured by the imaging section, and a transporting control section that controls the transporting section based on the transportation amount of the transport target medium computed by the transportation amount computing section, in which the imaging element includes a valid pixel area that is an area of a plurality of pixels in which electric charge can be accumulated in accordance with reflected light in which the light of the light emitting element is reflected on the transport target medium, and a shading area that is an area of a plurality of pixels in which the reflected light can be shaded, and the light emitting element emits light within the shading duration that is a duration of the imaging element reading a pixel signal of the shading area.

According to the configuration, in the valid pixel area of the imaging element, the image of the surface property of the transport target medium is formed when the light emitting element emits light within the shading duration. Because of this, it is possible to suppress division of the valid pixel area into the pixel area based on the light emitting of the light emitting element at the previous time, and the pixel area based on the light emitting of the light emitting element at the present time. Because of this, it is possible to suppress the decrease in the computation accuracy of the transportation amount of the transport target medium.

In addition, in the transporting apparatus, it is preferable that the light emitting element ends emitting light within the shading duration.

According to the configuration, it is possible to suppress entering of the light of the light emitting element into the valid pixel area when reading the valid pixel area. Because of this, it is possible to suppress the decrease in the quality of the image read in the valid pixel area.

In addition, in the transporting apparatus, it is preferable that the imaging section causes the light emitting element to emit light based on at least any of a first reading synchronizing signal that is a standard of reading the image of one frame by the imaging element and a second reading synchronizing signal that is a standard of reading the pixel signal by line formed by a plurality of pixels arranged in the horizontal direction of the imaging element.

According to the configuration, since a signal synchronized to the reading of the imaging element is used, it is possible for the light emitting element to emit light more accurately within the shading duration, compared with the configuration in which the light emitting element 120 is caused to emit light, based on the signal in which there is a concern that the vertical synchronizing signal from the imaging section 110, that is, the reading of the imaging element 130 is not synchronized as in the printing apparatus 100 in the related art.

In addition, in the transporting apparatus, it is preferable that the imaging section completes transmitting of the pixel signal of the valid pixel area to the transportation amount computing section before the next shading duration ends.

According to the configuration, the transportation amount computing section computes the transportation amount of the transport target medium based on the image of the valid pixel area acquired per the light emitting element emitting light, that is, the image on the transport target medium continuously captured. Because of this, it is possible that the transportation amount computing section computes the transportation amount of the transport target medium according to the actual transportation of the transport target medium.

In addition, in the transporting apparatus, it is preferable that the imaging section includes an area changing section that changes the number of the lines of the valid pixel area read from the imaging element, and the area changing section changes the number of the lines of the valid pixel area based on the transportation amount computed by the transportation amount computing section.

According to the configuration, it is possible to form a valid pixel area appropriate for the transporting speed of the transport target medium. Because of this, in the case, for example, where the transporting speed of the transport target medium is slow, that is, in the case where the transportation amount of the transport target medium is small, the valid pixel area read from the imaging element is small, and the image transmitted to the transportation amount computing section is small. Because of this, the computing time of the transportation amount computing section is short.

According to another aspect of the invention, there is provided another printing apparatus including a transporting section that transports a transport target medium, a printing section that performs printing on the transport target medium transported by the transporting section, an imaging section that includes a light emitting element that applies light towards the transport target medium and an imaging element that is an imaging element in which a plurality of pixels are arranged in a two-dimensional manner in a horizontal direction and a vertical direction and that images the transport target medium based on the light of the light emitting element, a transportation amount computing section that computes the transportation amount of the transport target medium based on the image of the transport target medium captured by the imaging section, and a transporting control section that controls the transporting section based on the transportation amount of the transport target medium computed by the transportation amount computing section, in which the imaging element includes a valid pixel area that is an area of a plurality of pixels in which electric charge can be accumulated in accordance with reflected light in which the light of the light emitting element is reflected on the transport target medium, and a shading area that is an area of a plurality of pixels in which the reflected light can be shaded, and the light emitting element emits light within a shading duration that is a duration of the imaging element reading a pixel signal of the shading area.

According to the configuration, in the valid pixel area of the imaging element, the image of the surface property of the transport target medium is formed when the light emitting element emits light within the shading duration. Because of this, it is possible to suppress the division of the valid pixel area into the pixel area based on the light emitting of the light emitting element at the previous time, and the pixel area based on the light emitting of the light emitting element at the present time. Because of this, since the image quality in the valid pixel area improves, it is possible to suppress the decrease in the computation accuracy of the transportation amount of the transport target medium.

In addition, in the printing apparatus, it is preferable that the imaging section completes transmitting of a pixel signal of the valid pixel area to the transportation amount computing section before the next shading duration ends.

According to the configuration, the transportation amount computing section computes the transportation amount of the transport target medium based on the image of the valid pixel area acquired per the light emitting element emitting light, that is, the image on the transport target medium continuously captured. Because of this, it is possible that the transportation amount computing section computes the transportation amount of the transport target medium according to the actual transportation of the transport target medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, one embodiment of the printing apparatus will be described with reference to the drawings. Meanwhile, the printing apparatus according to this embodiment is, for example, configured with an ink jet printer that performs printing by ejecting ink that is an example of liquid on the transport target medium. In addition, the printer is a so-called serial type printer that performs printing by moving the printing section in a direction intersecting with the transporting direction of the transport target medium.

Figure 1:
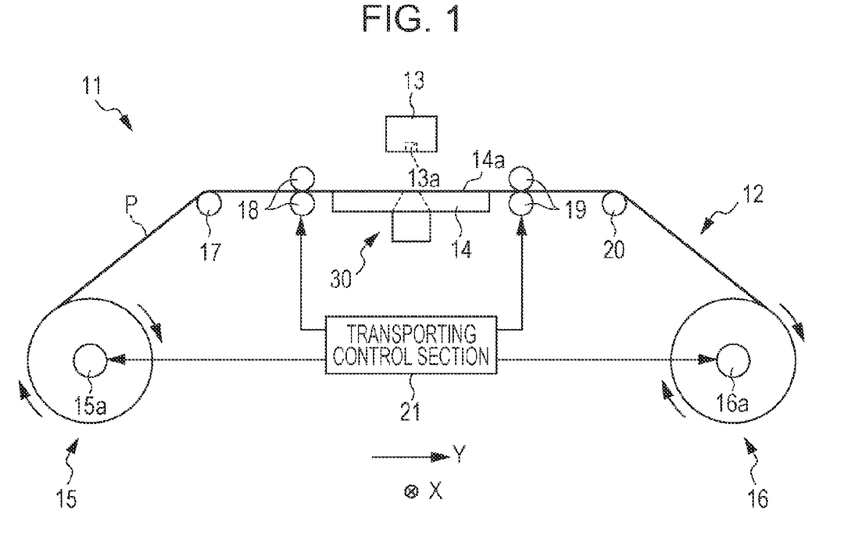
FIG. 1 is a schematic configuration diagram of a printing apparatus of one embodiment.

As illustrated in FIG. 1, a printing apparatus 11 includes a transporting apparatus 12 that transports a continuous-form paper P in a long sheet shape that is an example of the transport target medium and a printing section 13 that performs printing by ejecting ink in accordance with the continuous-form paper P transported by the transporting apparatus 12. In addition, the printing apparatus 11 includes a transporting control section 21 that controls transportation of the continuous-form paper P by the transporting apparatus 12.

The printing section 13 ejects ink towards the continuous-form paper P from a plurality of nozzles 13a formed in the printing section 13, while moving towards the width direction X of the continuous-form paper P (in FIG. 1, the direction intersecting with the paper surface).

In the printing apparatus 11, at the position facing across the transporting route of the continuous-form paper P with regard to the printing section 13, a supporting member 14 that supports the continuous-form paper P transported by the transporting apparatus 12 is arranged. The surface facing the printing section 13 in the supporting member 14 is configured with a horizontal supporting surface 14a that supports the continuous-form paper P transported by the transporting apparatus 12.

The transporting apparatus 12 includes a feeding section 15 that feeds the continuous-form paper P, and a winding section 16 that winds the continuous-form paper P that is fed from the feeding section 15 and is subjected to printing by the printing section 13. In FIG. 1, the feeding section 15 is arranged at the position on the left side that is the upstream side of the transporting direction Y (right direction in FIG. 1) in the continuous-form paper P, while the winding section 16 is arranged at the position on the right side that is the downstream side.

In the feeding section 15, a feeding shaft 15a that extends in the width direction X is provided so as to be driven to rotate. In the feeding shaft 15a, the continuous-form paper P is supported in a state where the continuous-form paper P is wound in a roll shape in advance so as to rotate integrally with the feeding shaft 15a. In addition, by the feeding shaft 15a driven to rotate, the continuous-form paper P is fed from the feeding shaft 15a towards the downstream side of the transporting route.

At the downstream side of the feeding shaft 15a in the transporting route, a first relay roller 17 for winding the continuous-form paper P transported from the feeding shaft 15a and leading the continuous-form paper P to the supporting member 14 is provided so as to rotate. At the downstream side of the feeding shaft 15a in the transporting route, a pair of paper feeding rollers 18 that pinches the continuous-form paper P transported from the first relay roller 17 and leads the continuous-form paper P to the supporting member 14 is provided.

At the downstream side of the supporting member 14 in the transporting route, a pair of paper discharging rollers 19 is provided, which pinches and leads the area of the continuous-form paper P where printing is completed through the supporting member 14 to the downstream side by rotationally driving. At the downstream side of the pair of paper discharging rollers 19 in the transporting route, a second relay roller 20 for winding the continuous-form paper P transported from the pair of paper discharging rollers 19 and leading the continuous-form paper P to the winding section 16 is provided. Meanwhile, in this embodiment, by the pair of paper feeding rollers 18 and the pair of paper discharging rollers 19, a transporting section in which the continuous-form paper P is transported is configured.

In the winding section 16 in which the transporting route is arranged at the downstream side of the second relay roller 20, a winding shaft 16a that extends in the width direction X is provided so as to be driven to rotate. In addition, the continuous-form paper P on which printing is completed and which is transported from the second relay roller 20 is wound in turn by the winding shaft 16a by the winding shaft 16a being driven to rotate.

In addition, in the supporting member 14, an imaging apparatus 30 that is an example of an imaging section for detecting the transportation amount of the continuous-form paper P in a non-contact state is attached. The imaging apparatus 30 images the texture (surface property) of the lower surface supported by the supporting surface 14a that is a surface of the continuous-form paper P on which printing is not performed, computes the transportation amount of the continuous-form paper P by a template matching process based on the image data imaged in such a way, and outputs the computation result to a transporting control section 21. The transporting control section 21 controls the transportation of the continuous-form paper P by the transporting apparatus 12 by correcting the paper feeding amount of the continuous-form paper P by a known technique based on the transportation amount of the continuous-form paper P. Meanwhile, this computation of transportation amount of the continuous-form paper P is the same as the computation of the transportation amount of continuous-form paper P in JP-A-2014-87965.

Figure 2:
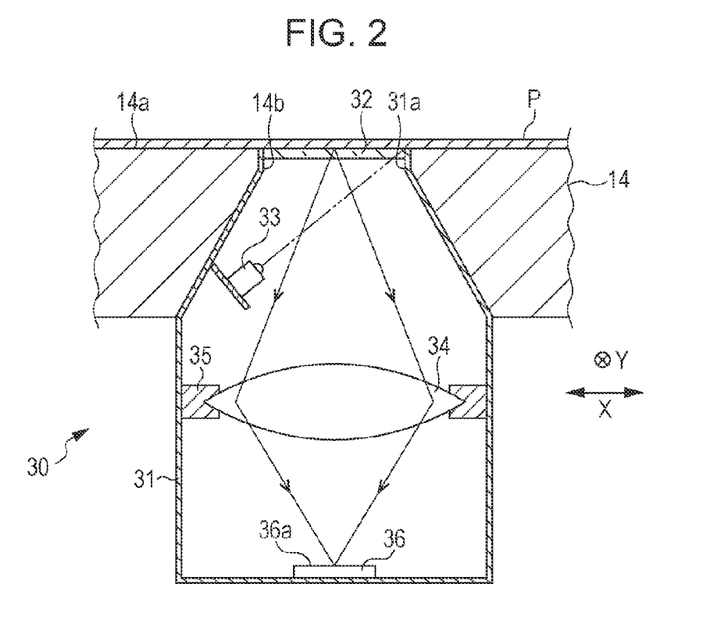
FIG. 2 is a schematic sectional view of an imaging apparatus of the printing apparatus.

As illustrated in FIG. 2, the imaging apparatus 30 includes a case 31 in a bottomed cylindrical shape. The case 31 is fixed to the supporting member 14 by a fixing section not illustrated in a state where the upper end portion of the case 31 is inserted from the lower side to a through hole 14b formed in the supporting member 14. At the upper end portion of the case 31, a detecting window 31a that is an opening section in a rectangular shape through which light is passed is formed. In the detecting window 31a, light transmitting glass 32 that is colorless and transparent for allowing light to pass and suppressing entering of paper dust, dirt, or the like is fitted.

Inside the case 31, at the one side of the width direction X (in FIG. 2, left side), a light applying section 33 that is an example of a light emitting element is attached. The light applying section 33 in this embodiment is configured by a light emitting diode (LED), and applies light from the side of the surface on which printing is not performed over the light transmitting glass 32 with regard to the continuous-form paper P transported on the supporting surface 14a. In this case, the light applying section 33 is arranged so as to obliquely apply light to the lower surface (the surface on which printing is not performed) of the continuous-form paper P from the width direction X side.

At a position further away than the light applying section 33 with regard to the continuous-form paper P inside the case 31, that is, a position at the down side further than the light applying section 33 inside the case 31, a condensing lens 34 is held on the case 31 by the holding member 35 attached to the case 31. The condensing lens 34 condenses reflected light that is light which is radiated from the light applying section 33, passed through the light transmitting glass 32, is reflected on the lower surface of the continuous-form paper P, again passed through the light transmitting glass 32, and entered the case 31.

Moreover, at a position further away than the condensing lens 34 with regard to the continuous-form paper P inside the case 31, that is, a position at the down side further than the condensing lens 34 inside the case 31, an imaging element 36 is provided. The imaging element 36 includes an imaging surface 36a in which the image of the lower surface of the continuous-form paper P on which light is condensed by the condensing lens 34 is formed.

Figure 3:
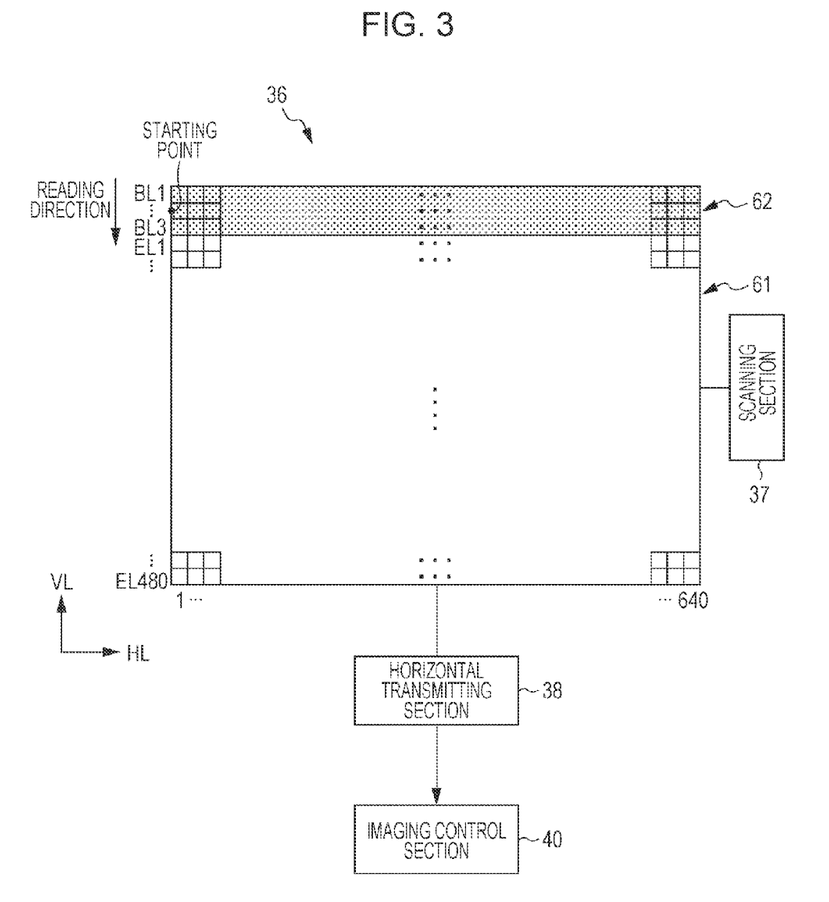
FIG. 3 is a schematic configuration diagram of the imaging element of the imaging apparatus and the periphery thereof.

As illustrated in FIG. 3, the imaging element 36 is an area image sensor in which a plurality of pixels are arranged in a two-dimensional manner in a horizontal direction HL and a vertical direction VL illustrated in FIG. 3. In this embodiment, a CMOS image sensor of a rolling-shutter type is used.

In the imaging element 36, 483 lines are arranged in the vertical direction VL with 640 pixels arranged in the horizontal direction HL as one line.

The imaging element 36 is divided into a valid pixel area 61 in the vertical direction VL and a shading area 62 (an area to which a dot is attached in the drawings). The valid pixel area 61 indicates an area in which electric charge generated in accordance with the reflected light that is light applied by the light applying section 33 (refer to FIG. 2) and reflected to the lower surface of the continuous-form paper P is accumulated. In this embodiment, the valid pixel area 61 indicates an area for 480 lines from line numbers EL1 to EL480 illustrated in the drawings. The shading area 62 indicates an area shaded by a member capable of shading (not illustrated) on the imaging surface 36a being provided. In this embodiment, the shading area 62 indicates an area for three lines from line numbers BL1 to BL3 illustrated in the drawings.

Figure 4:
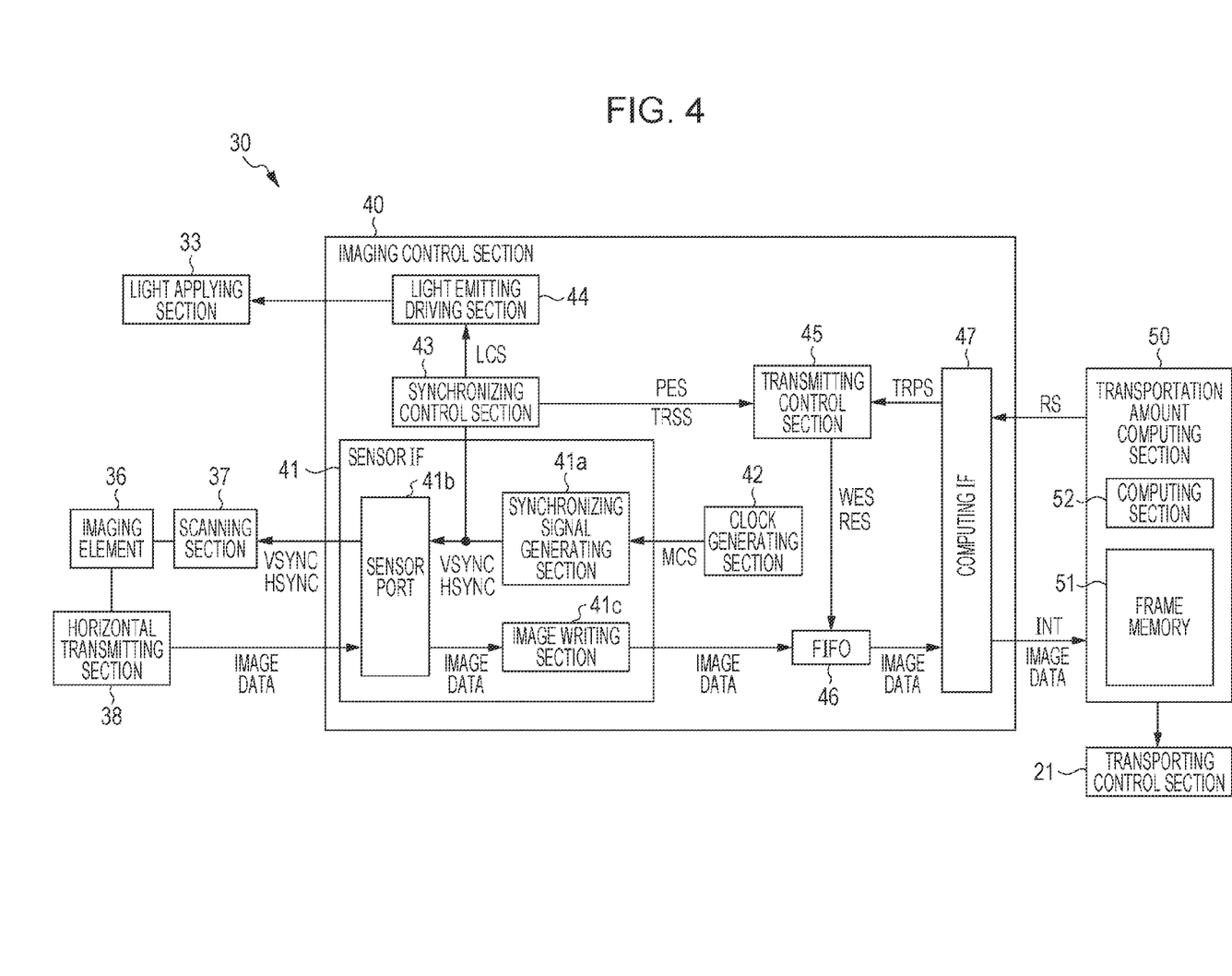
FIG. 4 is a block diagram illustrating the electric configuration of the imaging apparatus.

As illustrated in FIG. 4, the imaging apparatus 30 includes an imaging control section 40 that controls the emitting light of the light applying section 33 and the reading of each pixel of the imaging element 36, and outputs image data of the imaging element 36, and a transportation amount computing section 50 that computes the transportation amount of the continuous-form paper P based on the image data from the imaging control section 40.

As illustrated in FIGS. 3 and 4, in the imaging control section 40, a scanning section 37 that reads the electric charge amount of each pixel of the imaging element 36 and a horizontal transporting section 38 that transmits the data of the electric charge amount of each pixel for one line read by the scanning section 37 as a pixel signal to the imaging control section 40 are electrically coupled. In addition, the scanning section 37 and the horizontal transporting section 38 are electrically coupled to the imaging element 36.

As illustrated in FIG. 3, the scanning section 37 reads the pixel area for one line to the right end of the horizontal direction HL with the left end for the second line of the shading area 62 as a starting point of reading the imaging element 36. In addition, the scanning section 37 reads each image area for one line in turn from the shading area 62 towards the valid pixel area 61 as the reading direction in the drawings. That is, the scanning section 37 repeats the cycle of reading the pixel area for two lines of the shading area 62, reading the pixel area for 480 lines of the valid pixel area 61, and reading the pixel area for one line in the shading area 62 in turn.

The horizontal transporting section 38 transmits each image data for one line formed by the image signals when the scanning section 37 reads the pixel area for one line to the imaging control section 40 that controls the operation of the imaging apparatus 30.

The imaging control section 40 includes a sensor interface (IF) 41, a clock generating section 42, a synchronizing control section 43, a light emitting driving section 44, a transmitting control section 45, a first-in first-out (FIFO) 46, and a computing interface (IF) 47.

The sensor IF 41 receives the image data for one line of the horizontal transporting section 38 and controls the operation of the scanning section 37. In the sensor IF 41, the clock generating section 42 is electrically coupled. The clock generating section 42 outputs a master clock signal MCS that is a standard of synchronization of signals in the imaging control section 40 to the sensor IF 41.

The sensor IF 41 includes a synchronizing signal generating section 41a, a sensor port 41b, and an image writing section 41c based on the master clock signal MCS. The synchronizing signal generating section 41a outputs a vertical synchronizing signal VSYNC that is an example of the first reading synchronizing signal and a horizontal synchronizing signal HSYNC that is an example of the second reading synchronizing signal to the sensor port 41b and the image writing section 41c. The sensor port 41b outputs the vertical synchronizing signal VSYNC and the horizontal synchronizing signal HSYNC received from the synchronizing signal generating section 41a to the scanning section 37, receives the image data for one line of the horizontal transporting section 38 and outputs the image data to the image writing section 41c. The image writing section 41c writes an image data in the valid pixel area 61 (refer to FIG. 3) among the image data received from the sensor port 41b on the FIFO 46.

The vertical synchronizing signal VSYNC in this embodiment is a signal that is a standard of starting the reading of 1 piece of image data imaged by the imaging element 36. In addition, the horizontal synchronizing signal HSYNC in this embodiment is a signal that is a standard of starting the reading of the pixel area for one line of the imaging element 36. Because of this, the synchronizing signal generating section 41a outputs the vertical synchronizing signal VSYNC 1 time to the synchronizing control section 43 in a frame duration FT that is a duration of reading 1 piece of image data and outputs the horizontal synchronizing signal HSYNC 483 times, which corresponds to the number of lines of the imaging element 36, to the synchronizing control section 43 in 1 frame duration FT.

The synchronizing control section 43 controls the light emitting driving section 44 and the transmitting control section 45 based on the vertical synchronizing signal VSYNC and the horizontal synchronizing signal HSYNC received from the synchronizing signal generating section 41a.

The synchronizing control section 43 has a counter, performs count when the horizontal synchronizing signal HSYNC is received, and resets the count when the count reaches "483". The synchronizing control section 43 outputs the light emitting controlling signal LCS for driving the light emitting driving section 44 to the light emitting driving section 44, and outputs the pixel valid signal PES for allowing the writing of the image data of the valid pixel area 61 on the FIFO 46 and a sensor side transmission preparing signal TRSS that indicates the preparation for writing by the sensor IF 41 on the FIFO 46 is completed to the transmitting control section 45.

The light emitting driving section 44 is configured by a known LED driving circuit including a LED driver.

The light emitting driving section 44 supplies electric power to the light applying section 33 for the predetermined duration. Thereby, the light applying section 33 emits light for the predetermined duration. The light applying section 33 in this embodiment emits light within the duration of the scanning section 37 reading the pixel area for two lines of the imaging element 36.

The transmitting control section 45 controls the writing and reading of the image data inside the FIFO 46.

The transmitting control section 45 reads the image data from a writing valid signal WES for rendering the writing by the image writing section 41c on the FIFO 46 valid, and the FIFO 46, and outputs a reading valid signal RES for transmitting the image data to the computing IF 47 to the FIFO 46.

The FIFO 46 is a memory that temporarily stores the image data. The FIFO 46 transmits the image data for one line to the computing IF 47 in the order of age of the image data.

The computing IF 47 converts the image data received from the FIFO 46 and transmits the image data to the transportation amount computing section 50 based on the predetermined communication standard (in this embodiment, PCI express) and outputs an interruption signal INT to the transportation amount computing section 50 when the transmission of the image data for 1 frame is completed. In addition, the computing IF 47 outputs a computing section side transmission preparation signal TRPS that indicates the preparation for receiving the image data by the transportation amount computing section 50 is completed to the transmitting control section 45.

The transportation amount computing section 50 operates at a processing speed different from the imaging control section 40. The transportation amount computing section 50 includes a frame memory 51 in which the image data received from the FIFO 46 is stored and a computing section 52 that computes the transportation amount of the continuous-form paper P based on the image data stored in the frame memory 51. The computing section 52 outputs a transmission requiring signal RS that requires the transportation of the image data for the next 1 frame to the computing IF 47 and outputs the computed transportation amount of the continuous-form paper P to the transporting control section 21.

Hereinafter, the operation of the imaging apparatus 30 will be described.

The synchronizing control section 43 outputs a light emitting controlling signal LCS to the light emitting driving section 44 when the count of the horizontal synchronizing signal HSYNC is "1". The light emitting driving section 44 causes the light applying section 33 to emit light based on the light emitting controlling signal LCS. The emitted light is applied to the continuous-form paper P, and the reflected light forms images on the imaging element 36. The formed image is converted to an electric signal and accumulated in the imaging element 36. In addition, the electric signal accumulated in the imaging element 36 is read based on the vertical synchronizing signal VSYNC and the horizontal synchronizing signal HSYNC, and is transmitted to the image writing section 41c of the sensor IF 41 of the imaging control section 40 through the horizontal transporting section 38.

The synchronizing control section 43 outputs a pixel valid signal PES to the transmitting control section 45 when the count of the horizontal synchronizing signal HSYNC is "3", that is, when the scanning section 37 starts the reading of the valid pixel area 61. The pixel valid signal PES is output to the transmitting control section 45 when the horizontal transporting section 38 transmits the image data for one line in the valid pixel area 61 to the sensor IF 41, that is, in the scope where the count of the horizontal synchronizing signal HSYNC is equal to or more than "4" and equal to or less than "482".

The transmitting control section 45 outputs the writing valid signal WES to the FIFO 46 when the pixel valid signal PES is received from the synchronizing control section 43. By this, the image writing section 41c writes the image data for one line on the FIFO 46 each time when the FIFO 46 receives the writing valid signal WES.

Meanwhile, the transmitting control section 45 outputs the reading valid signal RES to the FIFO 46 when the computing section side transmission preparation signal TRPS is received from the computing IF 47. In addition, the FIFO 46 reads the image data for one line of the FIFO 46 based on the reading valid signal RES and transmits the image data to the transportation amount computing section 50 through the computing IF 47.

The transportation amount computing section 50 outputs the transmission requiring signal RS to the computing IF 47 when the interruption signal INT is received from the computing IF 47, that is, when the image data for 1 frame is received from the computing IF 47, and starts computing the transportation amount of the continuous-form paper P. In addition, the computing section 52 of the transportation amount computing section 50 outputs the computed transportation amount of the continuous-form paper P to the transporting control section 21. The computing IF 47 outputs the computing section side transmission preparation signal TRPS to the transmitting control section 45 based on the interruption signal INT.

Figure 5:
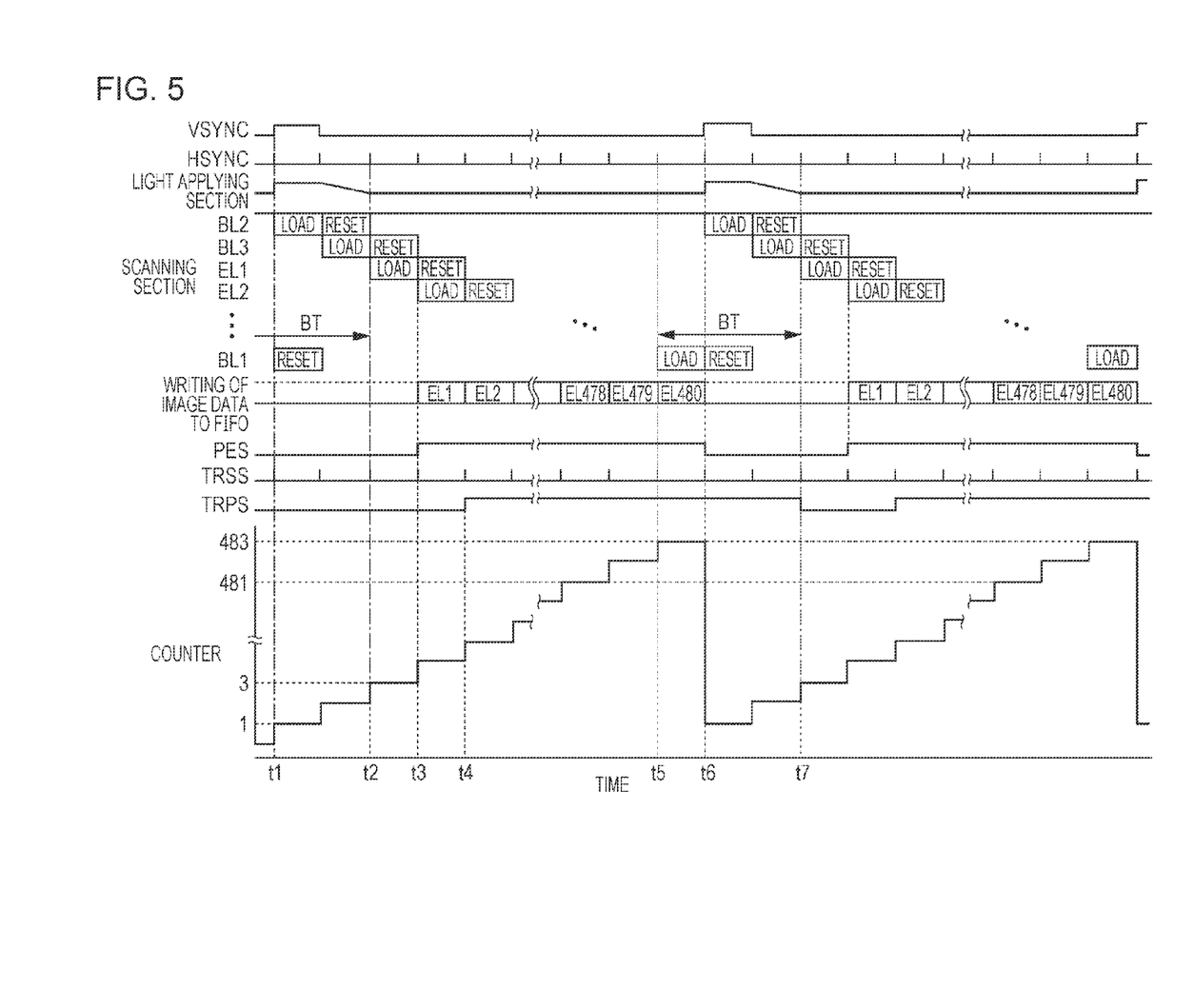
FIG. 5 is a time chart illustrating the operation of the imaging apparatus.

With reference to the FIG. 5, the operation of the imaging apparatus 30 of this embodiment will be described. Meanwhile, in the description below, each component of the imaging apparatus 30 to which a symbol is attached indicates each component of the imaging apparatus 30 illustrated in FIGS. 3 and 4.

At a time t1, the synchronizing signal generating section 41a outputs the vertical synchronizing signal VSYNC and the horizontal synchronizing signal HSYNC to the scanning section 37 and the synchronizing control section 43. Here, the count of the horizontal synchronizing signal HSYNC is "1", the scanning section 37 reads a line number BL2 of the shading area 62 of the imaging element 36, and the light emitting driving section 44 causes the light applying section 33 to emit light for the predetermined duration (a duration for the scanning section 37 reading two lines of the imaging element 36) based on the light emitting controlling signal LCS of the synchronizing control section 43. Because of this, the light applying section 33 stops emitting light at a time t2 when the reading of the shading area 62 of the imaging element 36 by the scanning section 37 (line numbers BL2 to BL3) is completed. As a result, the formed image at the time t1 is accumulated as an electric signal in the imaging element 36. The accumulated electric signal is read in the order of line number and is transmitted to the image writing section 41c of the imaging control section 40. The scanning section 37 repeats the reset of the reading of the image signal for one line of the imaging element 36 and the image signal for the read one line based on the horizontal synchronizing signal HSYNC from the imaging control section 40 per one line.

In addition, at the time t2, the scanning section 37 starts reading a line number EL1 of the valid pixel area 61 of the imaging element 36, and performs reset of the reading of the pixel signal of each line of the valid pixel area 61 to a time t5 and the pixel signal for the read one line in the order of line number.

Thereby, since the light applying section 33 emits light in a shading duration BT that is a duration of the scanning section 37 reading the shading area 62 of the imaging element 36, the reflected light from the light applying section 33 does not enter the valid pixel area 61 in the duration of the scanning section 37 reading the valid pixel area 61 of the imaging element 36. Because of this, noise does not enter the valid pixel area 61.

In addition, since the light applying section 33 does not emit light in the duration of the scanning section 37 reading the valid pixel area 61 of the imaging element 36, the valid pixel area 61 is configured by each pixel when the light applying section 33 emits light in the duration from the time t1 to the time t2. Because of this, of the valid pixel area 61, it is possible to suppress forming of an area based on the light emitting of the light applying section 33 at the previous time, and an area based on the light emitting of the light applying section 33 at the present time.

In addition, at a time t3, the scanning section 37 writes the image data for each pixel of the line number EL1 of the valid pixel area 61 on the horizontal transporting section 38, and, while the image data is read by the horizontal transporting section 38, the synchronizing control section 43 outputs the pixel valid signal PES to the transmitting control section 45. The synchronizing control section 43 outputs the pixel valid signal PES for the duration of the scanning section 37 reading line numbers EL1 to EL480 of the valid pixel area 61 (a duration from the time t3 to a time t5), and outputs a sensor side transmission preparation signal TRSS to the FIFO 46 each time when transmission of the pixel signal of each line of the valid pixel area 61 to the FIFO 46 is completed. Thereby, the sensor IF 41 transmits the image data for one line in turn to the FIFO 46 from the time t3, and the image data is written on the FIFO 46.

In addition, at a time t4, when the computing IF 47 outputs the computing section side transmission preparation signal TRPS to the transmitting control section 45, the transmitting control section 45 outputs the reading valid signal RES to the FIFO 46, and reads the image data written on the FIFO 46 in turn and outputs the image data to the computing IF 47. Moreover, the computing IF 47 outputs the image data output from the FIFO 46 to the frame memory 51 of the transportation amount computing section 50.

Furthermore, at a time t6, the synchronizing control section 43 counts the horizontal synchronizing signal HSYNC at the same time of performing reset, since the count of the horizontal synchronizing signal HSYNC reached "483". Because of this, at the time t6, the count of the horizontal synchronizing signal HSYNC is "1".

Here, the scanning section 37 again reads the line number BL2 of the shading area 62 of the imaging element 36, and the light emitting driving section 44 again causes the light applying section 33 to emit light for the predetermined duration based on the light emitting controlling signal LCS of the synchronizing control section 43.

The transmission of the image data of the valid pixel area 61 of the imaging element 36 to the frame memory 51 is completed before a time t7 when the shading duration BT ends. In addition, at the time t7, the transportation amount computing section 50 computes the transportation amount of the continuous-form paper P based on the image data of 1 frame duration FT.

Since only the image data of the valid pixel area 61 of the imaging element 36 is transmitted to the frame memory 51, it is possible to use the image data of the valid pixel area 61 in the shading duration BT as a transmitting duration.

According to the printing apparatus 11 of this embodiment, the following effects can be obtained.

(1) Since the light applying section 33 emits light within the shading duration BT, in the valid pixel area 61 of the imaging element 36, the image of the surface property of the continuous-form paper P is formed when the light applying section 33 emits light in the shading duration BT. Because of this, it is possible to suppress division of the valid pixel area 61 into the imaging area based on the light emitting of the light applying section 33 at the previous time, and the pixel area based on the light emitting of the light applying section 33 at the present time. Because of this, it is possible to suppress the decrease in the computation accuracy of the transportation amount of the continuous-form paper P by the transportation amount computing section 50.

(2) Since the light applying section 33 stops emitting light within the shading duration BT, it is possible to suppress entering of the light from the light applying section 33 when the scanning section 37 reads the valid pixel area 61 of the imaging element 36. Because of this, it is possible to suppress the decrease in accuracy of reading of the pixel signal of the imaging element 36 by the scanning section 37. Therefore, it is possible to suppress the decrease in the quality of the image data read in the valid pixel area 61.

(3) The synchronizing control section 43 controls the light emitting driving section 44 so that the light emitting timing of the light applying section 33 is within the shading duration BT based on the vertical synchronizing signal VSYNC and the horizontal synchronizing signal HSYNC which are reading synchronizing signals at the time of being input to the imaging element 36 (scanning section 37) from the synchronizing signal generating section 41a. Because of this, since it is possible to detect the shading duration BT more accurately than in a configuration in which the vertical synchronizing signal from the imaging section in the related art, that is, a signal synchronized to a transmitting timing that is not synchronized to the reading of the imaging element is used, it is possible to accurately cause the light applying section 33 to emit light within the shading duration BT.

(4) The imaging control section 40 transmits the image data of the valid pixel area 61 of the imaging element 36 to the transportation amount computing section 50 before the next shading duration BT ends. Because of this, it is possible for the transportation amount computing section 50 to compute the transportation amount of the continuous-form paper P based on the image data continuously captured.

(5) The imaging control section 40 transmits only the image data of the valid pixel area 61 of the imaging element 36 to the transportation amount computing section 50. Because of this, since the transmission amount is smaller than in the case where the image data of the entire area of the imaging element 36 is transmitted, the transmission time of the image data is short. Because of this, the computing time of the transportation amount computing section of the continuous-form paper P by the transportation amount computing section 50 is short.

(6) The transportation amount computing section 50 computes the transportation amount of the continuous-form paper P based on the interruption signal INT.

Because of this, it is possible to synchronize the timing of the light applying section 33 emitting light and the timing of computing the transportation amount of the continuous-form paper P by the transportation amount computing section 50. Thereby, the imaging control section 40 and the transportation amount computing section 50 of which the processing speeds are different are synchronized. Because of this, since, for example, comparing with the configuration in which the imaging control section 40 and the transportation amount computing section 50 are synchronized by adding an area in which the image data is accumulated in the frame memory 51 of the transportation amount computing section 50, there is no case where the size of the frame memory 51 is large, it is possible to achieve miniaturization of the imaging apparatus 30 and reduction of the cost.

This embodiment may be modified into the following embodiments.

In the embodiment, the number of the lines of the imaging element 36, and the number of the pixels arranged in the horizontal direction HL in one line can be changed to any value.

In the embodiment, the number of the lines of the shading area 62 of the imaging element 36 can be changed to any value. For example, the number of the lines of the shading area 62 may be changed to 20 lines.

In the embodiment, the shading area 62 may be formed at both the end portions of the vertical direction VL of the imaging element 36, and the shading area 62 may be formed at the lower end portion of the vertical direction VL of the imaging element 36.

In the embodiment, the starting point of reading in the imaging element 36 by the scanning section 37 can be changed to any value. For example, the starting point of reading by the scanning section 37 may be set as the left end of the line number BL1 of the shading area 62 in the imaging element 36.

In the embodiment, the shading area may be formed in at least any one end portion of the horizontal direction HL of the imaging element 36.

The scanning section 37 may read the imaging element 36 in the direction opposite to the direction of reading the imaging element 36 in the vertical direction VL by the scanning section 37 in the embodiment.

In the embodiment, the timing of the light applying section 33 emitting light can be changed to any value within the shading duration BT.

For example, the light applying section 33 emits light based on the vertical synchronizing signal VSYNC. In this case, the synchronizing control section 43 generates the light emitting controlling signal LCS, and outputs the light emitting controlling signal LCS based on the vertical synchronizing signal VSYNC to the light emitting driving section 44. Thereby, the light applying section 33 emits light at the time where the vertical synchronizing signal VSYNC is output to the scanning section 37.

In addition, for example, the light applying section 33 emits light at the time when the scanning section 37 starts reading the line number BL1 of the shading area 62 of the imaging element 36. In this case, the synchronizing control section 43 outputs the light emitting controlling signal LCS to the light emitting driving section 44 when the count of the horizontal synchronizing signal HSYNC is "482". In short, the light applying section 33 may emit light within the shading duration BT so that the light stops being emitted before the time when the reading of the valid pixel area 61 of the imaging element 36 is started by the scanning section 37.

The synchronizing control section 43 may start the count of the horizontal synchronizing signal HSYNC when the vertical synchronizing signal VSYNC is received, and, when the next vertical synchronizing signal VSYNC is received, may start the next count while resetting the count. In this case, the shading duration BT is, for example, a duration from when the vertical synchronizing signal VSYNC is received before the count of the horizontal synchronizing signal HSYNC is "3".

The synchronizing signal generating section 41a of the sensor IF 41 may set the vertical synchronizing signal VSYNC as the light emitting duration of the light applying section 33 (a duration of reading for two lines of the imaging element 36). In addition, the synchronizing signal generating section 41a may output the vertical synchronizing signal VSYNC for the duration corresponding to the shading duration BT.

In the embodiment, the synchronizing signal generating section 41a may generate a signal determining whether the scanning section 37 reads the shading area 62 of the imaging element 36 (shading signal) and output the signal to the synchronizing control section 43. The synchronizing control section 43 outputs the light emitting controlling signal LCS to the light emitting driving section 44 based on the shading signal.

Figure 6:
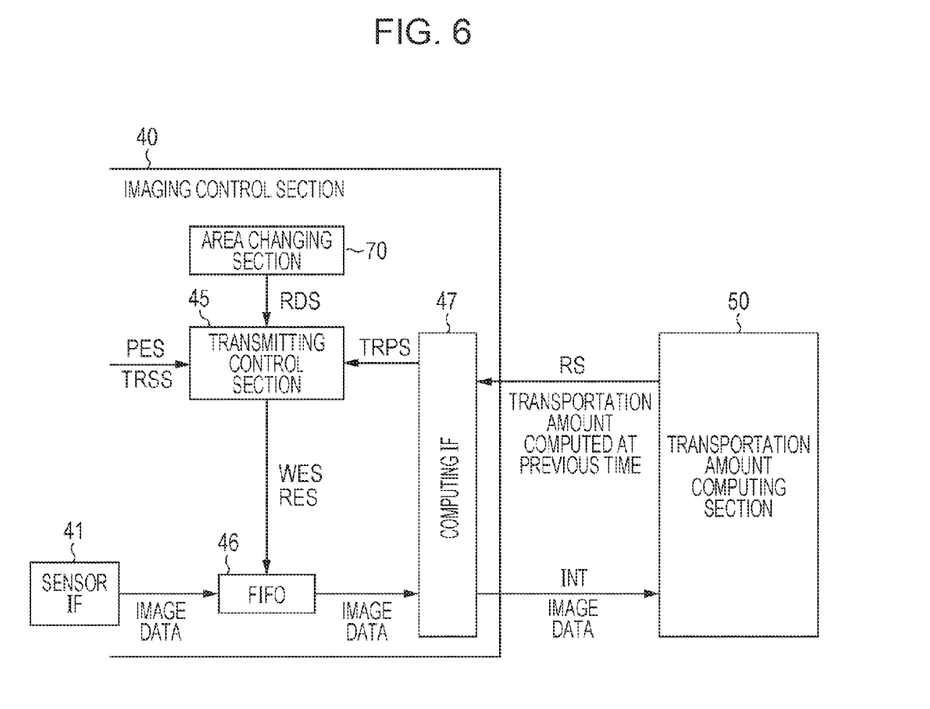
FIG. 6 is a block diagram illustrating the electric configuration of the imaging apparatus in a modification example.

In the embodiment, the area in which writing is performed in the FIFO 46 in the valid pixel area 61 of the imaging element 36 may be changed. Specifically, as illustrated in FIG. 6, the imaging control section 40 includes the area changing section 70 that changes the area in which the sensor IF 41 writes on the FIFO 46 (designated area) in the valid pixel area 61. The area changing section 70 outputs an area designating signal RDS for setting the designated area to the transmitting control section 45 based on the transportation amount of the continuous-form paper P that was computed at the previous time by the transportation amount computing section 50. The transmitting control section 45 outputs the writing valid signal WES to the FIFO 46 based on the area designating signal RDS. Thereby, since in the FIFO 46, only the image data of the designated area is written, the time of transmitting the image data from the FIFO 46 to the transportation amount computing section 50 through the computing IF 47 is short. Because of this, it is possible to decrease the computation time of the transportation amount of the continuous-form paper P by the transportation amount computing section 50.

The printing apparatus may be a dot impact printer or a laser printer if the apparatus is capable of printing on the transport target medium such as continuous-form paper. In addition, the printing apparatus is not limited to a printer only having a printing function, and may be a multifunction printer. Moreover, the printing apparatus is not limited to a serial printer, and may be a line printer or a page printer.

The transport target medium is not limited to the continuous-form paper P, and may be cut paper, resin film, metal foil, metal film, composite film of resin and metal (laminate film), fabrics, non-woven fabrics, ceramic sheets, or the like.

The state of the liquid discharged as a minute amount of liquid droplets from the printing section 13 include a granular state, a tear state, and a filamentous state, in which a trace of the liquid is left. In addition, the liquid here is usable as long as the liquid is ejected from the printing section 13. For example, the material is usable as long as the material is in the liquid state, and includes liquid body with high or low viscosity, sol, gel water, or other inorganic solvent, organic solvent, solution, or fluid body such as liquid resin. In addition, one state of the material is not only liquid, but includes the state of material in which particles formed from a solid body such as a pigment are dissolved into, diffused to, or mixed with a solvent. In the case where the liquid is ink, the ink includes general water based ink or oil based ink along with various liquid compositions such as gel ink and hot melt ink.

The entire disclosure of Japanese Patent Application No. 2014-211714, filed Oct. 16, 2014 is expressly incorporated by reference herein.

What is claimed is:

1. A transporting apparatus comprising:
a transporter that transports a continuous-form target medium;
an image capture device that includes a light emitting element that applies light towards the target medium and an imaging element in which a plurality of pixels are arranged in a two-dimensional manner in a horizontal direction and a vertical direction, the imaging element being configured to capture one image of the target medium in one frame by one vertical synchronizing signal, the one image being generated based on the light of the light emitting element, the one vertical synchronizing signal being configured to cause the light emitting element to emit the light during the one frame; and
a processor that computes a transportation amount of the target medium by comparing two images of the target medium captured at two frames respectively by the image capture device, one of the two images being the one image,
wherein the imaging element includes a valid pixel area of the plurality of pixels in which electric charge is accumulated in accordance with light of the light emitting element that is reflected on the target medium, the two images of the target medium being formed as a result of the accumulated electric charge, and a shading area of the plurality of pixels in which the reflected light is shaded, and
the light emitting element emits light within a duration in which the imaging element reads a pixel signal of the shading area.

2. The transporting apparatus according to claim 1, wherein the light emitting element ends the light emission within the shading duration.

3. The transporting apparatus according to claim 1, wherein the one vertical synchronizing signal is synchronized with a signal that is configured to make the light emitting element emit the light during the one frame.

4. The transporting apparatus according to any of claim 1, wherein the image capture device completes transmitting of a pixel signal of the valid pixel area to the processor before the next shading duration ends.

5. The transporting apparatus according to claim 1, wherein the image capture device changes the number of lines of the valid pixel area that reads the pixel signal from the imaging element,
the number of the lines of the valid pixel area being changed based on the transportation amount computed by the transportation amount computing section.

6. The transporting apparatus according to claim 1, wherein
three sequential lines of the plurality of pixels of the imaging element in the vertical direction are used as the shading area, and
the light emitting element is configured to emit light while the image capture device is reading pixel signals from two of the three sequential lines in the shading area.

7. The transporting apparatus according to claim 1, wherein three sequential lines of the plurality of pixels of the imaging element in the vertical direction are used as the shading area, the image capture device configured to:
read pixel signals from two of the three sequential lines in the shading area;
emit light by the light emitting element during the reading in the shading area; and
after emitting light, read pixel signals from lines of the plurality of pixels of the imaging element in the vertical directions in the valid pixel area.

8. The transporting apparatus according to claim 1, wherein
the imaging element is configured to:
read a plurality of images in a plurality of frames by a plurality of vertical synchronizing signals respectively, reading each of the frames being synchronized with and started by the corresponding vertical synchronizing signal, and
emit a plurality of lights, each of the plurality of emitting lights being synchronized with and started by the corresponding vertical synchronizing signal.

9. A printing apparatus comprising:
a transporting section that transports a continuous-form target medium;
a printing section that performs printing on the target medium transported by the transporting section;
an image capture device that includes a light emitting element that applies light towards the target medium and an imaging element in which a plurality of pixels are arranged in a two-dimensional manner in a horizontal direction and a vertical direction, the imaging element being configured to capture one image of the target medium in one frame by one vertical synchronizing signal, the one image being generated based on the light of the light emitting element, the one vertical synchronizing signal being configured to cause the light emitting element to emit the light during the one frame; and
a processor that computes a transportation amount of the target medium by comparing two of the target medium captured at two frames respectively by the image capture device, one of the two images being the one image, wherein the imaging element includes a valid pixel area of the plurality of pixels in which electric charge is accumulated in accordance with the light of the light emitting element that is reflected on the target medium, the two images of the target medium being formed as a result of the accumulated electric charge, and a shading area of the plurality of pixels in which the reflected light is shaded, and the light emitting element emits light within a duration in which the imaging element reads a pixel signal of the shading area.

10. The printing apparatus according to claim 9, wherein the image capture device completes transmitting of a pixel signal of the valid pixel area to the processor before the next shading duration ends.

11. A transporting apparatus comprising:

a transporter configured to transport a continuous-form target medium;

an image capture device including a light emitting element and an imaging element, the light emitting element being configured to apply light towards the target medium, the imaging element including a plurality of pixels arranged in a two-dimensional manner in a horizontal direction and a vertical direction and being configured to capture images of the target medium that are generated by light of the light emitting element, the image capture device generating a clock signal; and a processor configured to compute a transportation amount of the target medium transported by the transporter by comparing two images of the target medium captured by the image capture device, wherein a first group of a plurality of lines of the pixels of the imaging element arranged in the vertical direction are used as a shading area, a second group of a plurality of lines of the pixels of the imaging element arranged in the vertical direction are used as a valid pixel area, the image capture device being configured to:

start reading pixel signals in the shading area based on the clock signal;

emit light by the light emitting element during reading in the shading area based on the clock signal; and after emitting light, read pixel signals in the valid pixel area based on the clock signal.

12. The transporting apparatus according to claim 11, wherein the imaging element is configured to capture one image of the transport target medium in one frame by one vertical synchronizing signal, the one image being generated based on one light of the light emitting element, the one vertical synchronizing signal being configured to cause the light emitting element to emit the one light during the one frame.

13. The transporting apparatus according to claim 12, wherein the one vertical synchronizing signal is synchronized with a signal that is configured to make the light emitting element emit the light during the one frame.

14. The transporting apparatus according to claim 11, wherein the imaging element is configured to read pixel signals from pixels by line arranged in the horizontal direction in one frame by a horizontal synchronizing signal, the pixel signals being generated based on one light of the light emitting element, the horizontal synchronizing signal being configured to cause the light emitting element to emit the one light during the one frame.

15. The transporting apparatus according to claim 14, wherein the one horizontal synchronizing signal is synchronized with a signal that is configured to make the light emitting element emit the light during the one frame.

* * * * *